United States Patent [19]
Du Parc et al.

[11] Patent Number: 5,677,925
[45] Date of Patent: *Oct. 14, 1997

[54] POWER CONVERTER DEVICE FOR DIRECT CURRENT POWER SUPPLY TO AN ELECTRIC ARC FURNACE

[75] Inventors: Jacques Du Parc, Recloses; Christophe Glinski, Ermont; Michel Wursteisen, Montigny S/Loing, all of France

[73] Assignee: Cegelec Metals Systems, Avon, France

[*] Notice: The term of this patent shall not extend beyond the expiration date of Pat. No. 5,463,653.

[21] Appl. No.: 549,234

[22] Filed: Oct. 27, 1995

Related U.S. Application Data

[63] Continuation of Ser. No. 233,683, Apr. 26, 1994, Pat. No. 5,463,653.

[30] Foreign Application Priority Data

Apr. 30, 1993 [FR] France .................................. 93 05183
Oct. 22, 1993 [FR] France .................................. 93 12661

[51] Int. Cl.⁶ ............................. H05B 7/144; H05B 7/148
[52] U.S. Cl. ............................ 373/104; 373/102; 363/70
[58] Field of Search ............................. 373/102, 104, 373/108; 363/70; 315/148; 323/210

[56] References Cited

U.S. PATENT DOCUMENTS

| | | | |
|---|---|---|---|
| 4,021,721 | 5/1977 | Tachibana | 321/47 |
| 4,461,010 | 7/1984 | Titus | 373/108 |
| 4,586,188 | 4/1986 | Buhler | 373/108 |
| 4,725,939 | 2/1988 | Boisdon | 373/108 |
| 4,857,821 | 8/1989 | Takeda | 373/104 |
| 5,349,605 | 9/1994 | Campbell | 373/25 |

FOREIGN PATENT DOCUMENTS

| | | |
|---|---|---|
| 2588432 | 4/1987 | France . |
| 4035233A1 | 5/1991 | Germany . |
| 4118756A1 | 12/1992 | Germany . |
| 614571 | 11/1979 | Switzerland . |
| WO9120176 | 6/1991 | WIPO . |

OTHER PUBLICATIONS

W. Spatny et al, "Power Supplies for DC Arc Furnaces", *ABB Review*, No. 6, 1992, pp. 11–16.
M. Muslu et al, "Voltage Flicker Calculations for a 35 MW DC Electric Arc Furnace Supplied by a 12 Pulse Rectifier", *Proceedings of the American Power Conference*, No. 52, 1990, pp. 453–457.
French Search Report FR 9305183.
D.G. Seguier and J.P. Swan, "Reduction of Perturbations Induced by Three-Phase Rectifiers in Industrial Power Systems", Industrial Applications, Oct., 1991, pp. 164–170.

*Primary Examiner*—Tu B. Hoang
*Attorney, Agent, or Firm*—Sughrue, Mion, Zinn, Macpeak & Seas, PLLC

[57] ABSTRACT

A power converter device for supplying direct current to an electric arc furnace comprises at least one transformer with its primary fed with a three-phase alternating current and delivering to at least one secondary a three-phase current applied to a rectifier system outputting to the load a rectified voltage and current. The rectifier system comprises controlled semiconductors for each secondary and a freewheel circuit. The controlled semiconductors are triggered with essentially variable firing angles, modified to increase the duration of conduction in the freewheel circuit whilst reducing the duration of conduction in the triggered semiconductors, and vice versa, so as to deliver to the load a substantially constant active power or reactive power despite variations in the impedance of the load.

19 Claims, 5 Drawing Sheets

PRIOR ART
FIG.4
PRIOR ART
FIG.5
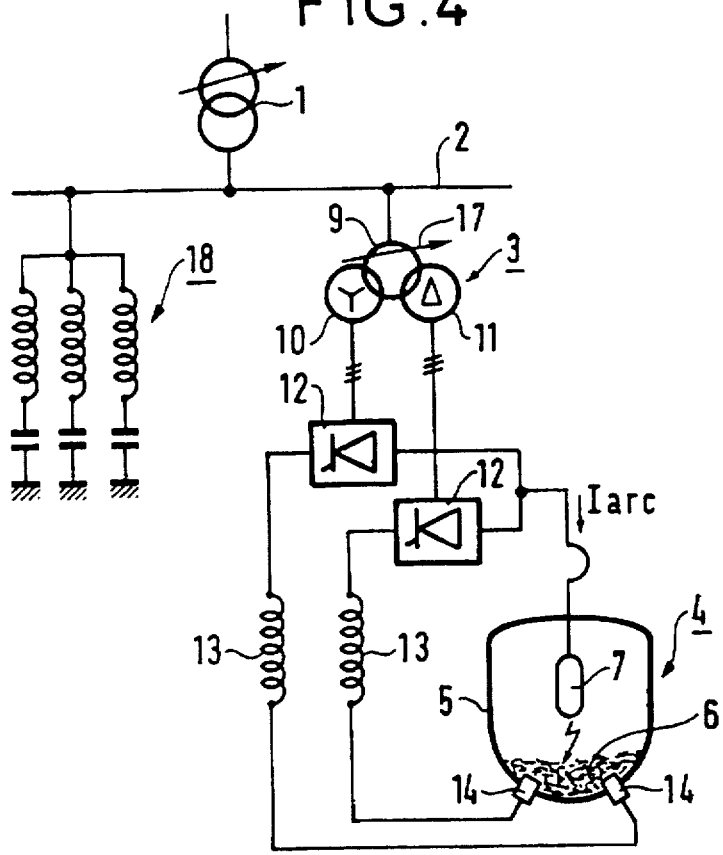
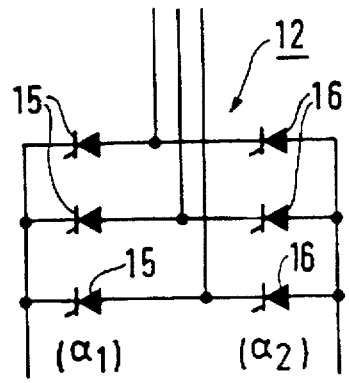
FIG.6 PRIOR ART
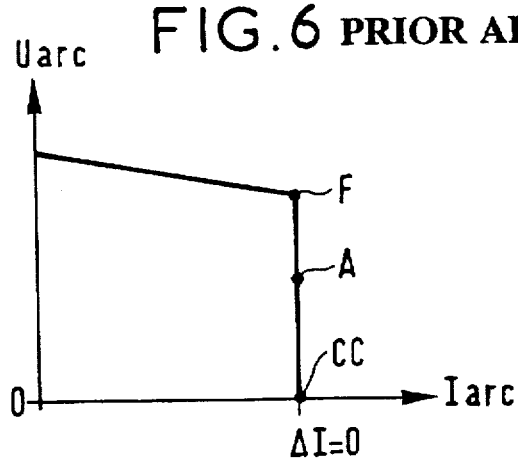
PRIOR ART
FIG.7
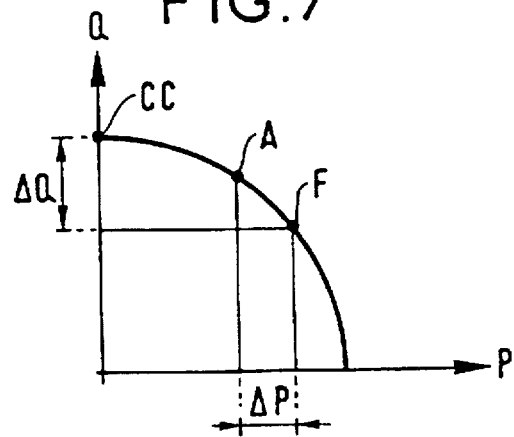

FIG. 8
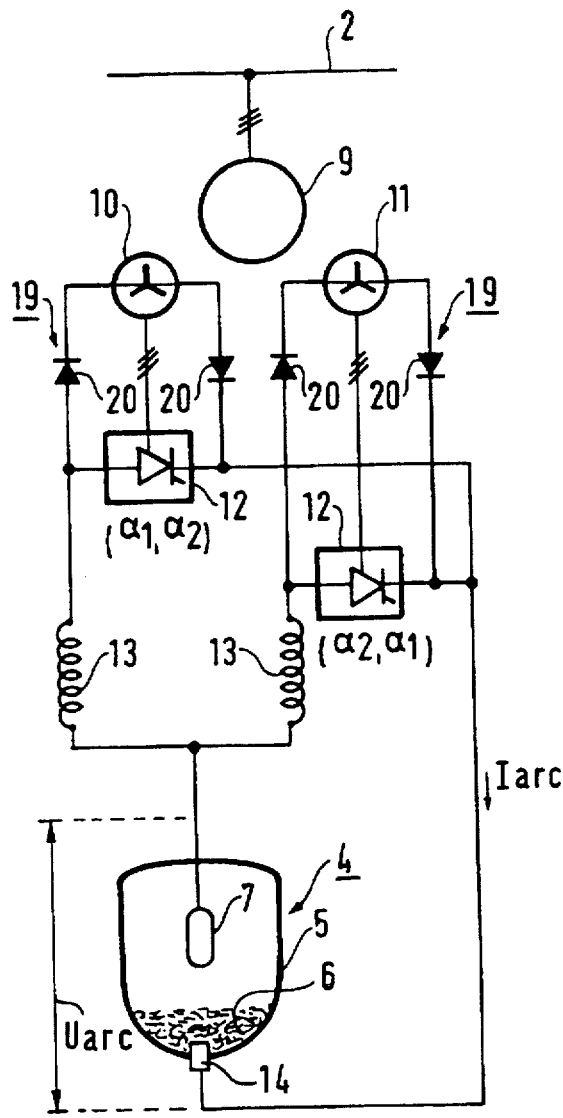
PRIOR ART FIG. 9
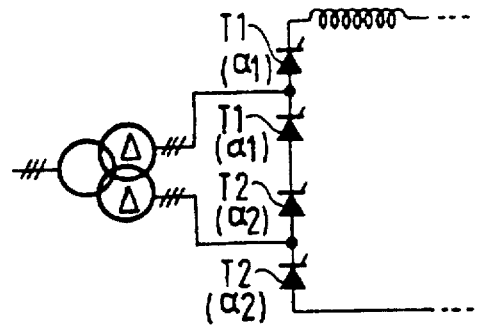
PRIOR ART FIG. 10
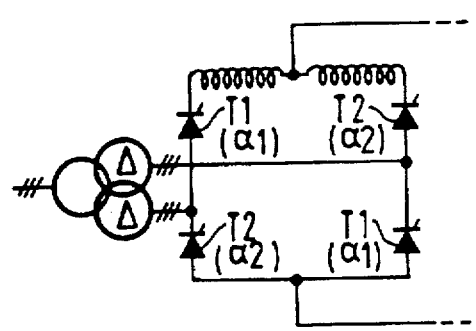
PRIOR ART FIG. 11
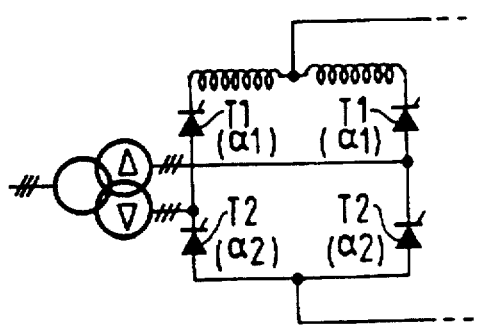

POWER CONVERTER DEVICE FOR DIRECT CURRENT POWER SUPPLY TO AN ELECTRIC ARC FURNACE

This is a continuation application No. 08/233,683 filed Apr. 26, 1994 now U.S. Pat. No. 5,463,653.

BACKGROUND OF THE INVENTION

1. Field of the Invention

The invention concerns an improved power converter device for direct current power supply to an electric arc furnace.

2. Description of the Prior Art

Electrical arc furnaces are used in melting and refining scrap metal.

The invention applies more particularly to supplying direct current to such loads, the electrical parameters of which are likely to vary widely and frequently.

FIG. 1 shows the oldest technique for supplying power to arc furnaces.

It entails feeding three-phase alternating current directly to the electrodes: a first step down transformer 1 supplies a set of busbars 2 distributing the current to one or more individual variable transformers 3 which reduce the voltage to the required level and feed the furnace 4 directly. The latter comprises a furnace chamber 5 receiving scrap metal 6 in its lower part and having three mobile electrodes 7 each connected to one phase of the secondary circuit of the step down transformer 3, so that an arc 8 is struck between the electrodes 7 and the scrap metal 6 to melt and subsequently refine the latter.

FIGS. 2 and 3 show the operating characteristics of an alternating current furnace of this kind. In particular, FIGS. 2 and 3 show the voltage ($U_{arc}$)/current ($I_{arc}$) characteristic respectively, and the reactive power (Q)/active power (P) characteristic for the various operating points (CC representing the short-circuit operating point, and F thru A representing the regime corresponding to melting of the scrap metal and refining of the scrap metal.

It can be seen that an alternating current supply furnace of this kind delivers substantially constant power ($\Delta P$ is very low) but is subject to high variations in the reactive power ($\Delta Q$) and the current ($\Delta I$), operation being substantially at constant active power excluding short-circuit situations. In particular, the large variations in reactive power can cause high voltage fluctuations on the power supply system, injecting electrical interference into the latter, in particular in the form of "flicker", i.e. voltage fluctuations in the 0–30 Hz band causing lights to flicker.

For a few years there has been a trend to substitute direct current power supply for alternating current power supply by inserting an AC/DC converter between the downstream transformer and the electrodes.

Direct current power supply has two essential advantages from which all other advantages derive, namely:

The positive pole of the arc is the scrap metal itself, whether solid or melted, the mobile electrode (of which there may be one or more) constituting the negative pole. The dissipation of energy along the arc being non-linear and greater on the positive pole side, the scrap metal is heated more than the electrode.

Current surges due to arc short-circuits, which occur very frequently during start-up and melting of the scrap metal, are limited by the converter.

This leads to reduced electrode consumption, reduced electrical interference fed back into the supply, especially flicker, and improved furnace productivity.

The direct current converters used until now are of the general type shown diagrammatically in FIG. 4.

The primary 9 of the downstream transformer feeds one or more secondaries 10, 11 each connected to a respective conventional "Graetz bridge" rectifier 12 using thyristors. One output terminal of each bridge is connected to a common mobile electrode 7 and the other terminal is connected, usually via a smoothing inductor 13, to a respective bottom or hearth electrode 14 in direct contact with the scrap metal 6.

The Graetz bridge 12 shown diagrammatically in the other figures is shown in detail in FIG. 5.

It includes two series 15, 16 each of three thyristors connected in "double parallel" (or "full-wave three-phase") mode with comoned cathodes and commoned anodes, respectively, and with the other electrode connected to the same (star or delta) multiphase voltage system; each series 15, 16 of thyristors is triggered with a respective common firing angle $\alpha_1$ or $\alpha_2$.

To limit the harmonics injected into the power supply system a plurality of six-pulse Graetz bridges is usually employed, each fed by phase-shifted secondaries. FIG. 4 shows two secondaries 10, 11 phase-shifted 30° by a star-delta coupling feeding two Graetz bridges, but the solution can be generalized to three Graetz bridges (with phase-shifts of −20°, 0°, +20°), four Graetz bridges (with phase-shifts of 0°, +15°, +30° and +45°), and so on, each Graetz bridge constituting an elementary six-pulse converter.

Although the remainder of this description considers only a system with two rectifiers, for example: two Graetz bridges, it is to be understood that the invention can be generalized at will to a larger number of rectifiers fed by phase-shifted secondaries.

FIGS. 6 and 7 are homologous to FIGS. 2 and 3 in the case of a direct current device.

It can be seen that the device operates at constant current but with a widely variable active power, unlike the alternating current device. There are smaller, but still significant, variations in the reactive power Q. On average, the reactive energy consumption remains high, which usually implies the presence of a load regulator 17 for the downstream transformer and a relatively large compensator battery 18. In this respect the direct current device does not achieve any significant improvement compared to an alternating current device.

The reactive power variations ($\Delta Q$) from one operating regime to the other are nevertheless smaller than in the case of an alternating current power supply, whence smaller voltage fluctuations on the input side (on the power supply system) and reduced flicker. However, in the case of power supplies which are insufficiently rated, these voltage variations proportional to the reactive power consumption and inversely proportional to the supply short-circuit power often remain excessive, especially because of the flicker, and require the use of extremely expensive further correction means ("antiflicker" devices or Thyristor Control Reactors TCRs), as for most alternating current solutions.

Considering the instantaneous reactive power consumption, however, note the very significantly lower direct current values, as current regulation by the converter is usually fast enough to limit the short-circuit current surge to a virtually negligible value.

One object of the invention is to remedy the respective drawbacks of alternating current solutions and direct current solutions by proposing a new direct current converter design which can significantly reduce reactive power consumption and significantly improve the voltage/current characteristics supplied to the direct current arc, whilst reducing the overall cost of the converter by simplifying the downstream transformer (the load regulator is no longer necessary) and significantly reducing the size of the compensator battery, typically by half.

It is explained below that the direct current converter of the invention can operate at substantially constant active power, as in the case of a furnace supplied direct with alternating current, but with low reactive power consumption and without any uprating of the converter or the associated transformer.

It is also shown that, by virtue of the teaching of the invention, it is possible to influence the reactive power/active power (Q/P) characteristic in a very simple manner in order to optimize it according to the context of use of the furnace.

It is possible, for example, to obtain a characteristic which minimizes the reactive power consumption for a given operating point or, alternatively, a characteristic which minimizes variations in reactive power about its mean value, especially in the case of low power rating supplies for which reducing the flicker is one of the main imperatives, both from the point of view of efficiency (minimizing interference injected into the power supply system) and in respect of the cost of the installation. (by eliminating the "anti-flicker" devices).

Also, the operating characteristics of the furnace can be chosen such that the reactive power consumption remains substantially constant despite any current: variations, especially in the event of variations in the impedance of the load.

SUMMARY OF THE INVENTION

The invention consists in a power converter device for supplying direct current to an electric arc furnace, comprising at least one transformer with its primary fed with a three-phase alternating current and delivering to at least one secondary a three-phase current applied to rectifier means outputting to the load a rectified voltage and current, said rectifier means being of the type comprising controlled semiconductors for each secondary, wherein the rectifier means comprise a freewheel circuit, said controlled semiconductors being triggered with essentially variable firing angles, modified to increase the duration of conduction in the freewheel circuit whilst reducing the duration of conduction in the triggered semiconductors, and vice versa, so as to deliver to the load a substantially constant active power or reactive power despite variations in the impedance of the load.

The freewheel circuit is advantageously a diode circuit so that the converter device is rendered non-reversible.

It is highly advantageous, the transformer including at least two secondaries, for the respective rectifier means supplied by these secondaries to be associated with each other in an "offset" arrangement, with non-equal respective firing angles.

In this latter case, in a first embodiment of the invention the firing angles are chosen, for a given operating point, to minimize the reactive power consumption, the mean value resulting over an operating cycle being then minimal.

In a second embodiment of the invention, on the other hand, the firing angles are chosen for a given rectified current to minimize variations in the reactive power about its mean value, especially in the form of flicker.

Moreover, the firing angles can advantageously be chosen so that, in the event of variation of the rectified current, the mean value of the reactive power consumption remains substantially constant.

In an advantageous embodiment of the invention the offset is a "parallel offset". Means are then preferably provided for cyclically permutating the directions of offset of the respective two rectifier means and/or for regulating the currents of the respective two rectifier means so as to render them substantially equal.

In an advantageous embodiment of the invention said controlled semiconductors of the rectifier means are configured as a Graetz bridge for each secondary, one output terminal of said bridge being connected to a negative electrode of the load, such as a mobile electrode of the furnace, and the other terminal being connected to a corresponding positive electrode, such as a bottom or hearth electrode, the freewheel circuit being inserted between the output terminals of the respective secondary of the transformer and the corresponding Graetz bridge.

A plurality of rectifier devices as defined above can be grouped into a common assembly in which the respective transformers are supplied with power with a phase-shift.

Other features and advantages of the invention emerge from a detailed description of the invention given with reference to the appended drawings in which the same reference numbers always denote similar parts.

BRIEF DESCRIPTION OF THE DRAWINGS

FIG. 4, already described, is a diagram showing the configuration of a prior art arc furnace supplied with direct current by converters.

FIG. 5 shows in more detail the known structure of a Graetz bridge.

FIGS. 6 and 7, already described, respectively shown the voltage/current and reactive power/active power characteristics of a prior art furnace supplied with direct current.

FIG. 8 is a diagram showing the configuration of an arc furnace supplied with direct current by a converter according to the invention.

FIGS. 9, 10 and 11 show known configurations for combining a plurality of identical converters with a relative phase-shift.

DETAILED DESCRIPTION OF THE PREFERRED EMBODIMENTS

Figure 1:
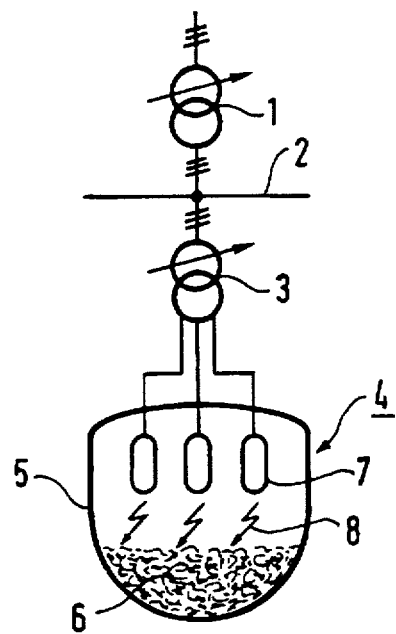
FIG. 1, already described, is a diagram showing the configuration of a prior art direct supply alternating current arc furnace.
Figure 2:
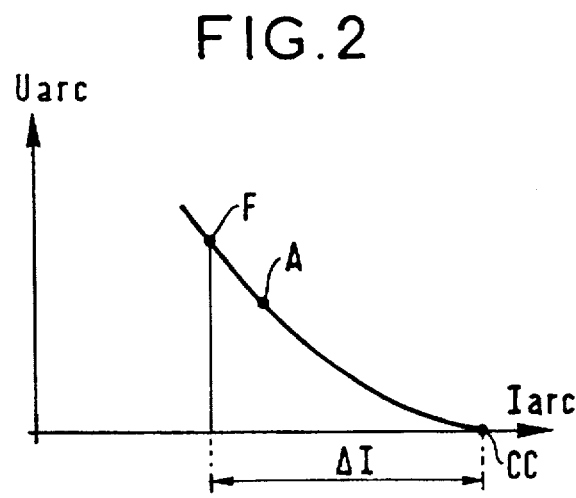
FIGS. 2 and 3, already described, respectively show the voltage/current and reactive power/active power characteristics of a prior art furnace of this kind supplied with alternating current.

The basic idea of the invention is to combine a conventional thyristor converter with a freewheel device and to provide a control law substantially corresponding to constant active power matched to the characteristics of the arc (to improve the efficiency of the furnace) and to the inherent capabilities of the converter.

A freewheel device is a prior art device which conducts in one direction and not in the other, biased to enable electrical energy accumulated in inductive components during conduction of the thyristors of the converter to flow into the load during the non-conducting period following this conduction period.

The freewheel device used in the invention is of the type which allows variation of the cyclic ratio of conduction of the main thyristors (according to the firing angle), the conduction time in the freewheel device increasing as that in the main thyristors decreases.

The invention uses a freewheel device of this type to increase the amplitude of the direct current when the DC voltage decreases (or vice versa), the firing angle of the thyristors increasing and the conduction cyclic ratio of the thyristors decreasing in a correlative manner (and reciprocally). This achieves operation at substantially constant active power without over-rating of either the thyristors or the transformer.

In the present example, concerning an arc furnace, the freewheel device is preferably as shown at 19 in FIG. 8, comprising diodes 20 between the center-point of the secondary 10 of the transformer and each output terminal of the Graetz bridge, the diode being obviously biased in the opposite direction to the direction of current flow in the diodes of the Graetz bridge.

The use of diodes rather than thyristors for the freewheel device renders the converter non-reversible.

This could seem a drawback at first sight, but in the intended application it is in fact a significant advantage.

In the conventional Graetz bridge the converter is a "two-quadrant reversible" converter (unidirectional direct current, bidirectional DC voltage); this allows for particularly effective current regulation in the event of an arc short-circuit, reducing the current surge to a negligible value; this is undoubtedly advantageous for the supply, but not for the arc short-circuit, which is required to disappear as quickly as possible as a result of melting of the scrap metal because of the short-circuit (in the solution using direct supply of alternating current, the current surge after an arc short-circuit enables the scrap metal to be melted faster —but at the cost of a reactive power peak.

By rendering the converter non-reversible, the invention reconciles these two aspects: at the time of an arc short-circuit the current surge due to the non-reversible character of the converter melts the scrap metal faster because of the short-circuit, without producing any reactive power peak in the power supply system, as the current surge in question flows only though the freewheel diodes. Better still, this current surge can be controlled and optimized to suit the inherent characteristics of the electrodes in order to reduce electrode wear.

According to another aspect of the invention it is advantageous to provide a plurality of secondaries of the transformer, such as the secondaries 10 and 11, combined in a so-called "offset" arrangement, in particular a "parallel offset" arrangement, the combination of the freewheel and offset effects enabling a very significant reduction in reactive power consumption.

To be more precise, the offset technique, which is known in itself and shown in the diagrams of FIGS. 9 to 11, consists in combining at least two converters of the same design and differentiating their firing control in such a way as to operate on the reactive power consumption; the expression "offset control" or "sequential control" is used. This technique is usually employed with a series combination on the direct current side of the two bridges, as shown in FIG. 9 (the so-called "series offset" circuit).

In the present instance, the direct current voltage to be supplied to the arc being relatively low compared to the ratings of high-power thyristors, a "series offset" circuit would make poor technological use of the thyristors. A "parallel offset" type circuit is therefore preferable, two variants of this circuit being shown in FIG. 10 and 11.

In the "parallel offset" circuit of FIGS. 10 and 11, two Graetz bridges are combined, each in reality comprising two offset half-bridges, and therefore generating even harmonics (unlike the conventional Graetz bridge), but with the internal offset of the two bridges crossing over in such a way as to eliminate even harmonics at the output.

However, a conventional "parallel offset" circuit (and therefore one with no freewheel device) as shown in FIG. 10 or 11 has the serious drawback of creating a risk of "recommutation" of the thyristors, especially near a zero direct current voltage. To limit this risk it has until now been necessary to limit the range of excursion of the firing angle, seriously reducing the reactive power gain.

A remarkable advantage of the combination of an offset and a freewheel device proposed by the invention is that it entirely eliminates this risk of recommutation provided that the freewheel device is of the type, as specified above, enabling a variable conduction cyclic ratio for the main thyristors. The full benefit of the cumulative reactive power gain is then obtained, with very high security of operation.

FIG. 8 shows the complete proposed circuit with a "diode neutral" freewheel device and the "parallel offset" configuration.

In a first embodiment of the invention an appropriate control law minimizes the reactive power consumption Q at all times (i.e. for a given operating point), and therefore also minimizes the reactive energy. This represents a situation in which the highest priority for parameter optimization goes to reduction of the average reactive power.

The adjustment parameters $\alpha_1$ and $\alpha_2$ are operated on to obtain a maximum offset, i.e. a maximum value of $|\alpha_1-\alpha_2|$. The other adjustment (it is possible to adjust two functions because the two parameters $\alpha_1$ and $\alpha_2$ can be operated on separately) adjusts the load direct current (or the active power).

Figure 12:
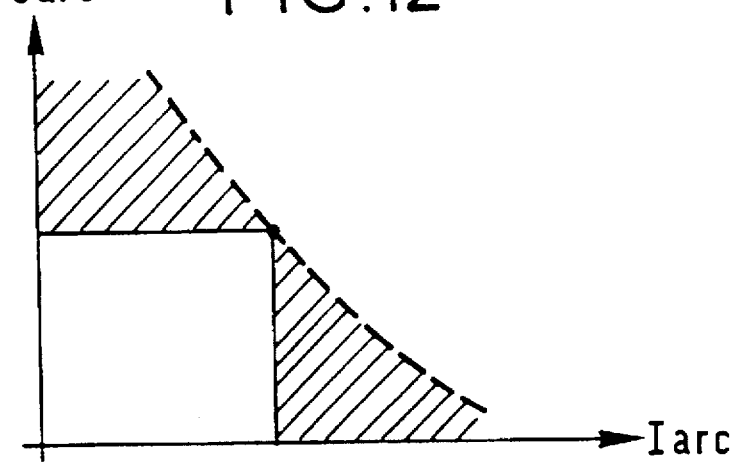
FIGS. 12 and 13 respectively shown the voltage/current and reactive power/active power characteristics of a furnace supplied with direct current by a converter according to the invention, the law governing variation of the Graetz bridge firing angles being shown at the bottom of FIG. 13.
Figure 13:
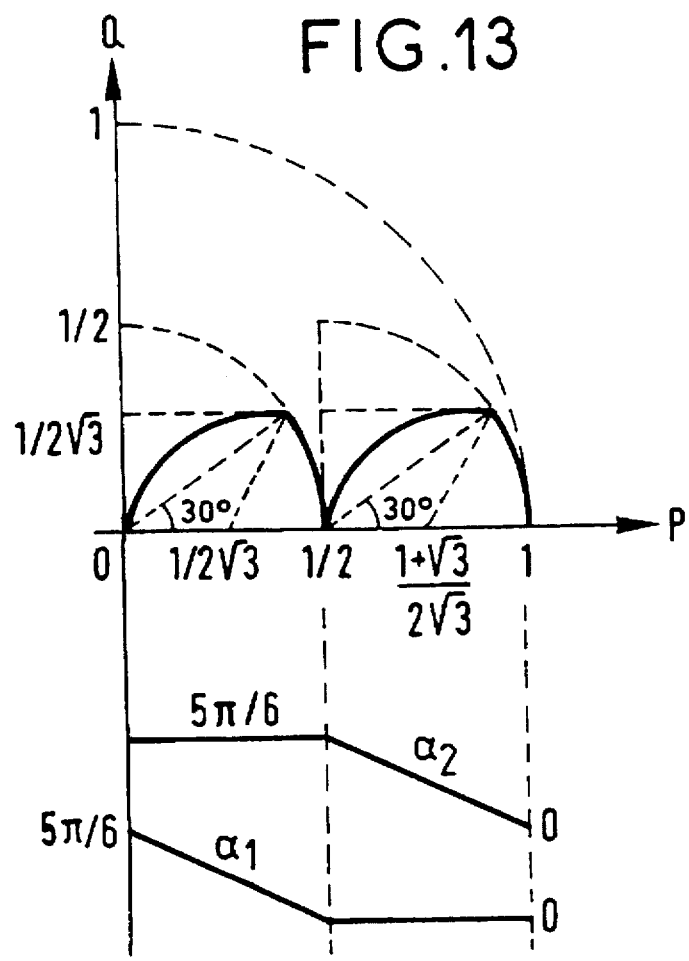

FIGS. 12 and 13 show the operating characteristics obtained with the FIG. 8 circuit in the case of this first embodiment (minimum mean reactive power consumption).

FIG. 12 shows the voltage/current characteristic, which is very similar to that obtained with direct supply of alternating current, i.e. operation at constant power (the shaded area shows the improvement in performance as compared with a conventional type DC converter).

FIG. 13 shows the reactive power/active power characteristic for a given operating point, i.e. for a constant arc direct current $I_{arc}$ (or rectified current $I_d$) and a variable arc equivalent resistance.

Figure 3:
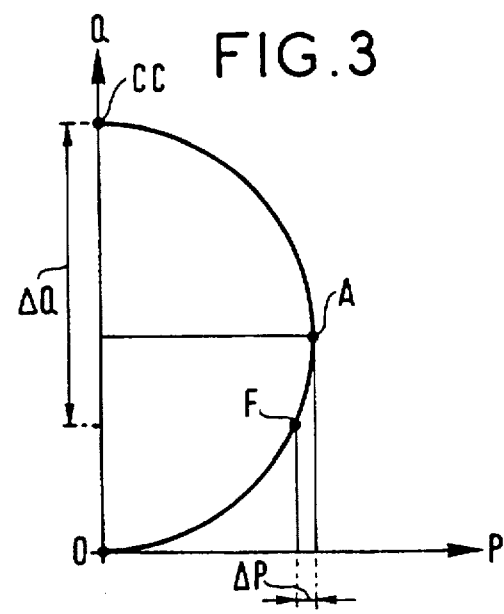

This characteristic shows that the reactive power consumption is at all times less than about one third of the maximal active power, which constitutes a considerable improvement over the prior art, whether the power supply is alternating current or direct current (compare FIGS. 3 and 7); the lower part of FIG. 13 shows the laws governing variation of the firing angles $\alpha_1$ and $\alpha_2$ as a function of the power delivery.

The advantages achieved by the invention by virtue of this circuit are very significant, namely:

elimination of the converter transformer regulator (on-load or off-load), very significant reduction in the power of the compensator-filter battery (by about half), significant improvement in productivity, in terms of duration and quantity, reduced fluctuation of voltage on the power supply system, reduced flicker, reduced converter losses, and reduced harmonics and high-frequency interference produced by the converter.

The only trade-off to obtain these advantages the addition of a diode freewheel device and the appropriate rating of the connections (smoothing inductors, cables, electrodes) on the output side of the, converter to suit the current surges allowed by the invention. In practice this reduces the investment cost of the electric arc furnace.

In a second embodiment of the invention the control law, i.e. the law governing variation of the firing angles $\alpha_1$ and $\alpha_2$ as a function of the power delivered, is chosen to favor not reduction of the mean reactive power consumption, as previously, but reduction of fluctuation in the reactive power about its mean value, and therefore the flicker level, achieved at the cost of a slightly increased mean reactive power consumption.

This procures a converter adapted to control the active power, while consuming constant reactive power, that can therefore be compensated by a simple battery of fixed capacitors (of the type shown at 18 in FIG. 4), avoiding any costly "TCR" or "antiflicker" device, even with a very weak supply.

To be more precise, in this second embodiment thee general circuit of FIG. 8 is retained (i.e. a Graetz bridge and offset freewheel circuit) with a control law for the parameters $\alpha_1$ and $\alpha_2$ in respect of which, unlike the previous case, there is no intention to maximize the offset $|\alpha_1 - \alpha_2|$.

Figure 14:
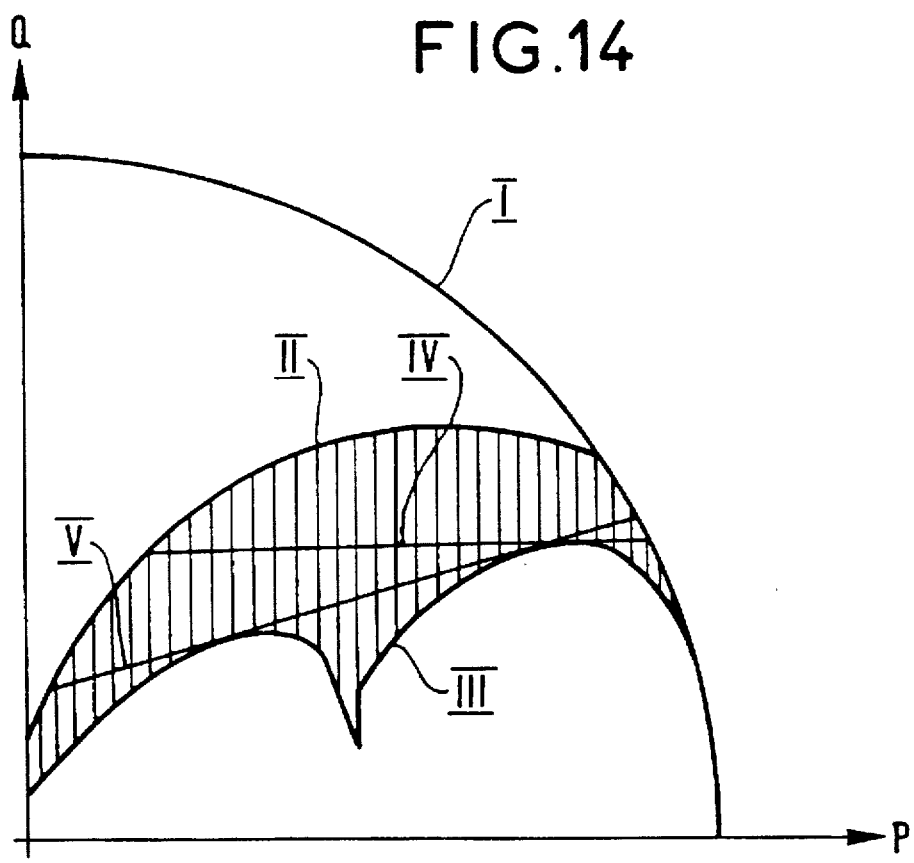
FIG. 14 shows various reactive power/active power characteristics that can be obtained by an appropriate choice of firing angle variation law, enabling operation of the furnace to be adapted to suit different use contexts.

FIG. 14 shows the reactive power Q/active power P characteristic for a given operating point, i.e. for a constant arc current $I_{arc}$ (or rectified current $I_d$) and a variable arc equivalent resistance. In this figure:

the characteristic I corresponds to a conventional converter with no freewheel and no offset (i.e. the characteristic of FIG. 7);

the characteristic II corresponds to the circuit with freewheel device but without offset, i.e. the circuit of FIG. 8 but with $\alpha_1 = \alpha_2$; and the characteristic III corresponds to the same circuit, with the maximum offset, i.e. maximum $|\alpha_1 - \alpha_2|$ (FIG. 13 characteristic).

Between a null offset and a maximal offset it is possible to obtain an infinity of different characteristics, all located in the shaded area between the characteristics II and III.

To be more precise, these characteristics are determined by the following equations:

$$\begin{cases} P = R \cdot I_d^2 = E_d \cdot I_d = E_{do} \cdot I_d \cdot f_p(\alpha_1, \alpha_2) \\ Q = E_{do} \cdot I_d \cdot f_q(\alpha_1, \alpha_2) \end{cases}$$

-continued

| | |
|---|---|
| P | being the active power, |
| Q | being the reactive power, |
| R | being the arc equivalent resistance, |
| $I_d$ | being the rectified current, |
| $E_d$ | being the rectified voltage on load, |
| $E_{do}$ | being the rectified voltage offload for a null offset, |
| $f_p, f_q$ | being the firing angle functions. |

Thus for a given operating point, i.e. given R and $I_d$, P are determined but Q is variable within a certain range.

Q may be kept constant, for example, which corresponds to the characteristic IV, or any other characteristic in the shaded area $I_d$, P and Q being therefore determined, $\alpha_1$ and $\alpha_2$ are deduced therefrom directly.

If it is assumed, as mentioned above, that the aim is to maintain the active power substantially constant by increasing the current $I_d$ when the arc equivalent resistance decreases (and vice versa), the operating point is moved and therefore the characteristic is moved on this diagram.

Figure 15:
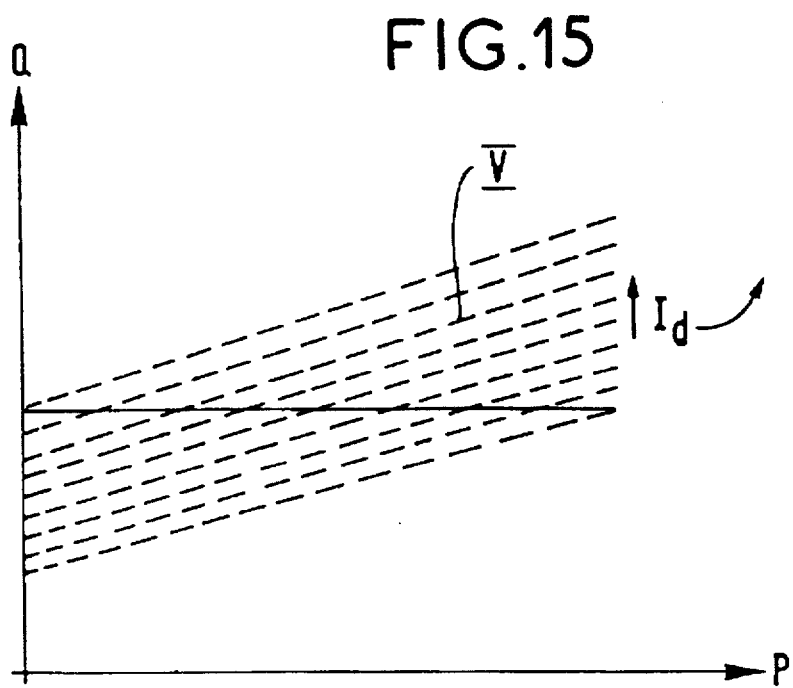
FIG. 15 shows the family of reactive power/active power curves obtained if the rectified current varies following a reduction in the impedance of the load.

Assume now that solving the system of two equations in two unknowns given above yields, for an operating point at a given constant current, a characteristic like the characteristic V in FIG. 14, i.e. an increasing monotonous function Q=f(P). In this case, when the current $I_d$ varies the characteristic V is displaced in the manner shown in FIG. 15, so defining a family of characteristics each corresponding to a given operating point (current $I_d$). It is then possible to choose decreasing monotonous variation law $I_d$=f(R) such that Q remains constant regardless of variations of $I_d$.

In this case, the converter has substantially constant reactive power Q and active power P over all the range of operation (or at least the major part thereof).

The general circuit described is open to various improvements.

Firstly, it can be advantageous to provide for cyclic permutation of the direction of offset of the two bridges ($\alpha_1 + \alpha_2$ for one, and $\alpha_2 + \alpha_1$ for the other) for balanced heating of the semiconductors and reduced risk of appearance of a direct current component harmful to the magnetic induction of the transformer.

The period of such cyclic permutations can be calculated according to the thermal time constant of the semiconductors and the maximum permissible direct current component for the transformer. As to the time of permutation within this period, it must be chosen to minimize the amplitude of the resulting switching transient, on the AC or DC side, as this transient must not be greater in magnitude than those resulting from natural fluctuations of the arc.

Secondly, the current regulation can be duplicated, i.e. provision can be made for separate regulation of the currents in each of the two Graetz bridges in parallel or, and preferably, simultaneous regulation of the sum of the two currents and their equality (so-called "multivariable diagonal" regulation).

If there is any imbalance between the two bridges there is imperfect compensation of even harmonics and it can be necessary to limit this imbalance (limitation of $\alpha_1 - \alpha'_1$ and $\alpha_2 - \alpha'_2$) in order to limit even harmonics to an acceptable level. This risk can arise if the two Graetz bridges are not perfectly connected in parallel, especially if the connection is made not at the output side terminals of the smoothing inductors but at the two bottom or hearth electrodes, deemed to be connected electrically by the "heel".

Thirdly, a plurality of subassemblies of the same type, as shown in FIG. 9, can be combined and supplied via phase-shifted transformers in order to reduce the harmonics. The phase-shifting of the transformers is preferably effected at their primaries, for example with "triangle zigzag" or "triangle intermediate tap" type windings.

There is claimed:

1. A power converter device for supplying direct current to an electric arc furnace including a load, said power converter device comprising at least one transformer with its primary fed with a three-phase alternating current and delivering to at least one of its secondary a three-phase current, said at least one secondary applying said three-phase current to a rectifier circuit which outputs to the load a rectified voltage and current, said rectifier circuit comprising controlled semiconductors for each said secondary, said controlled semiconductors being triggered with variable firing angles, modified to reduce a duration of time during which the triggered semiconductors conduct said three-phase current so as to deliver to the load a substantially constant active power or reactive power despite variations in impedance of the load.

2. A converter device according to claim 1, wherein said transformer includes at least two secondaries and portions of the rectifier circuit fed by said secondaries are coupled together in an offset arrangement with respective non-equal firing angles.

3. A converter device according to claim 2, wherein said firing angles are chosen, for a given operating point, to minimize reactive power consumption of the converter device so that a mean value of said reactive power consumption over an operating cycle of said converter device is minimal.

4. A converter device according to claim 2, wherein said firing angles are chosen, for a given rectified current, to minimize variations in reactive power consumption about a mean value thereof, determined over an operating cycle of said converter device, due to flicker.

5. A converter device according to claim 2, wherein said firing angles are chosen so that, in the event of variation of the rectified current, a mean value of reactive power consumption of the converter device over a period of time remains substantially constant.

6. A converter device according to claim 2, wherein said portions of said rectifier circuit are combined in a parallel offset circuit.

7. A converter device according to claim 2, further comprises a device which cyclically permutates directions of offset of said portions of the rectifier circuit.

8. A converter device according to claim 2, further comprising a device which regulates currents flowing through said portions of the rectifier circuit so as to render them substantially equal.

9. A converter device according to claim 1, wherein said controlled semiconductors of the rectifier circuit are in the form of a Graetz bridge for each secondary, one output terminal of said bridge being connected to a negative electrode of the load, which is a mobile electrode of the furnace, and the other terminal being connected to a corresponding positive electrode, which is a bottom or hearth electrode.

10. A power converter device for supplying direct current to an electric arc furnace including a load, said power converter device comprising at least one transformer with its primary fed with a three-phase alternating current and delivering to at least one secondary a three-phase current, said at least one secondary applying said three-phase current to a rectifier circuit which outputs to the load a rectified voltage and current, said rectifier circuit comprising controlled semiconductors for each secondary, said controlled semiconductors being triggered with essentially variable firing angles, said firing angles being chosen to minimize, within an operating range of the arc furnace, variations of the reactive power consumed by the converter device, with respect to a determined mean value.

11. A converter device according to claim 10, wherein said firing angles are chosen, for a given rectified current, to minimize variations in the reactive power about the mean value due to flicker.

12. A converter device according to claim 10, wherein said firing angles are chosen so that, in the event of variation of the rectified current, the mean value of reactive power consumption remains substantially constant.

13. A converter device according to claim 10, wherein said rectifier circuit is configured as a parallel offset circuit.

14. A converter device according to claim 10, further comprising a device which cyclically permutates directions of offset of the rectifier circuit.

15. A converter device according to claim 10, further comprising a device which regulates currents of portions of the rectifier circuit so as to render the currents substantially equal.

16. A converter device according to claim 10, wherein said controlled semiconductors of the rectifier circuit are in the form of a Graetz bridge for each secondary, one output terminal of said bridge being connected to a negative electrode of the load, which is a mobile electrode of the furnace, and the other terminal being connected to a corresponding positive electrode, which is a bottom or hearth electrode.

17. A converter device according to claim 10, wherein said rectifier circuit comprises a freewheel circuit.

18. A converter device according to claim 17, wherein said freewheel circuit is a diode circuit.

19. A converter device according to claim 10, wherein said firing angles are chosen so as to provide the load with an active power which is substantially constant, irrespective of the variations of the rectified current.

* * * * *